US012542574B2

United States Patent
Kitajima et al.

(10) Patent No.: US 12,542,574 B2
(45) Date of Patent: Feb. 3, 2026

(54) RADIO-FREQUENCY MODULE AND COMMUNICATION DEVICE

(71) Applicant: Murata Manufacturing Co., Ltd., Nagaokakyo (JP)

(72) Inventors: Hiromichi Kitajima, Nagaokakyo (JP); Takanori Uejima, Nagaokakyo (JP); Kiyoshi Aikawa, Nagaokakyo (JP); Takashi Yamada, Nagaokakyo (JP); Yoshihiro Daimon, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 304 days.

(21) Appl. No.: 18/473,329

(22) Filed: Sep. 25, 2023

(65) Prior Publication Data

US 2024/0014841 A1    Jan. 11, 2024

Related U.S. Application Data

(63) Continuation of application No. PCT/JP2022/010816, filed on Mar. 11, 2022.

(30) Foreign Application Priority Data

Mar. 31, 2021 (JP) ................. 2021-060094

(51) Int. Cl.
*H04B 1/38* (2015.01)
*H03F 3/24* (2006.01)
*H04B 1/00* (2006.01)

(52) U.S. Cl.
CPC ................. *H04B 1/38* (2013.01); *H03F 3/24* (2013.01); *H04B 1/006* (2013.01)

(58) Field of Classification Search
CPC ...... H04B 1/38; H04B 1/3827; H04B 1/3833; H04B 1/40; H04B 1/44; H04B 1/50;
(Continued)

(56) References Cited

U.S. PATENT DOCUMENTS 9,935,662 B2 * 4/2018 Khlat .................... H04B 1/0475
2021/0050876 A1 * 2/2021 Matsumoto .............. H04B 1/40
(Continued)

FOREIGN PATENT DOCUMENTS

JP 2002-359327 A 12/2002
JP 2005-203633 A 7/2005
(Continued)

OTHER PUBLICATIONS

International Search Report and Written Opinion mailed on Jun. 14, 2022, received for PCT Application PCT/JP2022/010816, filed on Mar. 11, 2022, 9 pages including English Translation.

*Primary Examiner* — Quochien B Vuong
(74) *Attorney, Agent, or Firm* — XSENSUS LLP

(57) ABSTRACT

A radio-frequency module includes one or more first electronic components disposed on one main surface and one or more second electronic components disposed on another main surface. The one or more first electronic components include at least one of a filter whose passband includes a first band, a switch connected to the filter, a power amplifier connected to the filter, and a switch connected to the filter. The one or more second electronic components include at least one of a filter whose passband includes a second band in which the frequency of a harmonic wave of a signal in the first band is included, a switch connected to the filter, a low-noise amplifier connected to the filter, and an inductor connected to a path that forms a connection between the first low-noise amplifier and an antenna connection terminal.

19 Claims, 3 Drawing Sheets

(58) Field of Classification Search
CPC ...... H04B 1/005; H04B 1/006; H04B 1/0064; H03F 3/19; H03F 3/195; H03F 3/24; H04M 1/00; H04M 1/02; H04M 1/0202; H04M 1/0206; H04M 1/0208; H04M 1/021; H04M 1/0212; H04M 1/0214; H04M 1/0216; H04M 1/0222
See application file for complete search history.

(56) References Cited

U.S. PATENT DOCUMENTS

| | | | | |
|---|---|---|---|---|
| 2022/0173086 A1* | 6/2022 | Yamaguchi | ............... | H04B 1/38 |
| 2022/0321154 A1* | 10/2022 | Takenaka | ................. | H04B 1/38 |
| 2023/0016198 A1* | 1/2023 | Yoshimi | .................. | H04B 1/04 |
| 2023/0208468 A1* | 6/2023 | Nakajima | ................ | H04B 1/44 |
| | | | | 455/78 |

FOREIGN PATENT DOCUMENTS

| | | | |
|---|---|---|---|
| JP | 2021-048567 | A | 3/2021 |
| WO | 2019/244816 | A1 | 12/2019 |
| WO | 2020/022180 | A1 | 1/2020 |
| WO | 2020/071021 | A1 | 4/2020 |
| WO | 2020/090557 | A1 | 5/2020 |

\* cited by examiner

RADIO-FREQUENCY MODULE AND COMMUNICATION DEVICE

CROSS-REFERENCE TO RELATED APPLICATIONS

This application is a continuation of international application no. PCT/JP2022/010816, filed Mar. 11, 2022, which claims priority to Japanese application no. 2021-060094, filed Mar. 31, 2021. The entire contents of both prior applications are hereby incorporated by reference.

TECHNICAL FIELD

The present disclosure relates to a radio-frequency module and a communication device.

BACKGROUND ART

The complexity of radio-frequency front-end modules for use in mobile communication devices such as mobile phones has been increasing, particularly due to adoption of advanced multi-band features. A conventional technique involves the use of two module substrates in a radio-frequency module with a view to reducing the size of the radio-frequency module.

CITATION LIST

Patent Document

Patent Document 1: International Publication No. 2020/022180

SUMMARY

Technical Problem

Such a conventional technique has a room for improvement in keeping harmonic waves in a transmission path from entering a reception path and consequently causing degradation of reception sensitivity.

The present disclosure provides a radio-frequency module and a communication device that eliminate or reduce the possibility that the reception sensitivity will be degrade by harmonic waves.

Solution to Problem

A radio-frequency module according to an exemplary aspect of the present disclosure incudes a first module substrate, a second module substrate, one or more first electronic components, one or more second electronic components, one or more third electronic components, and a plurality of external connection terminals. The first module substrate has a first main surface and a second main surface on opposite sides. The second module substrate has a third main surface and a fourth main surface on opposite sides. The third main surface is oriented toward the second main surface. The one or more first electronic components are disposed on one of the first main surface and the fourth main surface. The one or more second electronic components are disposed on the other one of the first main surface and the fourth main surface. The one or more third electronic components are disposed between the second main surface and the third main surface. The plurality of external connection terminals are disposed on the fourth main surface.

The one or more first electronic components include at least one of (i) a first filter whose passband includes a first band, (ii) a first switch connected between the first filter and a first antenna connection terminal, (iii) a first power amplifier connected to the first filter, and (iv) a second switch connected between the first filter and the first power amplifier. The one or more second electronic components include at least one of (i) a second filter whose passband includes a second band in which the frequency of a harmonic wave of a signal in the first band is included, (ii) a third switch connected between the second filter and a second antenna connection terminal, (iii) a first low-noise amplifier connected to the second filter, and (iv) an inductor connected a path that forms a connection between the first low-noise amplifier and the second antenna connection terminal.

Advantageous Effects

The radio-frequency module according to an exemplary aspect of the present disclosure eliminates or reduces the possibility that the reception sensitivity will be degraded by harmonic waves.

DETAILED DESCRIPTION

Figure 1:
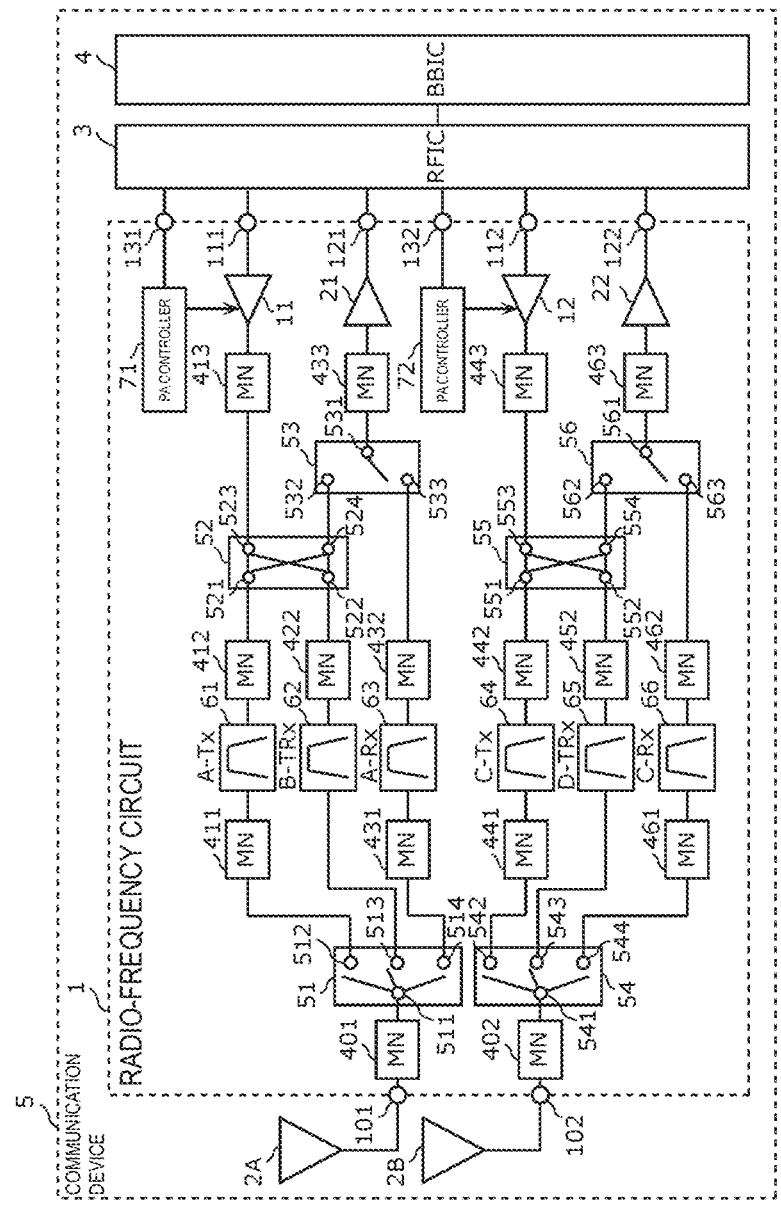
FIG. 1 is a diagram illustrating the circuit configuration of a radio-frequency circuit according to an exemplary embodiment and the circuit configuration of a communication device according to the exemplary embodiment.

Hereinafter, an exemplary embodiment of the present disclosure will be described in detail with reference to the accompanying drawings. The exemplary embodiment is just example. Details such as values, shapes, materials, constituent elements, and arrangements and connection patterns of the constituent elements in the exemplary embodiments are provided merely as examples and should not be construed as limiting the present disclosure.

The accompanying drawings are schematic diagrams in which elements may be exaggerated, eliminated, or changed in dimension as appropriate for purposes of illustration of the present disclosure; that is, the drawings are not necessarily drawn to scale in a strict sense, and the actual shape, positional relationship, and dimension ratios of each element in the drawings are not necessarily in agreement with those of the corresponding element of a product for practical use. Redundant description of substantially the same constituent elements, which are denoted by the same reference signs in the drawings, will be omitted or brief description of the elements will be provided where appropriate.

The x axis and the y axis in each of the accompanying drawings are orthogonal to each other in a plane parallel to main surfaces of a module substrate. For example, the module substrate viewed in plan is rectangular in shape, in which case the x axis is parallel to a first side of the module substrate, and the y axis is parallel to a second side of orthogonal to the first side of the module substrate. The z axis is perpendicular to the main surfaces of the module substrate. The positive side and the negative side in the direction of the z axis correspond to the upper side and the lower side, respectively.

The expression "connected to" in the description of the circuit configuration disclosed herein refers to not only direct connection formed by a connection terminal and/or a wiring conductor but also electrical connection formed by another circuit element. For example, the expression "connected between A and B" means that an element is located between A and B and connected to A and B, in which case the element may be connected in series with a path forming a connection between A and B or may be connected in parallel (shunt) between the path and the ground.

The expression "viewed in plan" used in relation to the layout of components of the present disclosure herein means that an object is viewed in such a manner that the object is orthographically projected on an x-y plane from the positive side in the direction of the z axis. The expression "A overlaps B when viewed in plan" herein means that the shape of A orthographically projected on the x-y plane overlaps the shape of B orthographically projected on the x-y plane. The expression "C is disposed between A and B" herein means that at least one of lines connecting freely selected points in A to freely selected points in B passes through C. The expression "A is joined to B" means that A is physically connected to B. The words (e.g., parallel, perpendicular) herein used to describe the relationship between elements, the words (e.g., rectangular) herein used to describe the shapes of elements, and numerical ranges mentioned in the description should not necessarily be interpreted in the strict sense and can be understood as meaning that a margin of several percent is acceptable as substantial equivalence.

The expression "a component is disposed on a substrate" used in relation to the layout of components of the present disclosure herein means that the component may be disposed on a main surface of the substrate or may be disposed in the substrate. The expression "a component is disposed on a main surface of a substrate" herein means that the component may be in contact with the main surface of the substrate or may be disposed over the main surface without direct contact with the main surface. For example, the component may be disposed on another component that is in contact with the main surface. The expression "a component is disposed on a main substrate of a substrate" may also mean that the component is disposed in a recess provided in the main surface. The expression "a component is disposed in a substrate" herein means that the component is encapsulated in a module substrate. The expression implies neither a state in which part of the component entirely located between two main surfaces of the substrate is not covered with the substrate nor a state in which only part of the component is located in the substrate. The expression "a component is disposed between two main surfaces of a substrate" herein means that the component may be in contact with both of the two main surfaces, only one of the two main surfaces, or neither of the two main surfaces.

EMBODIMENT

1 Circuit Configuration of Radio-Frequency Circuit 1 and Circuit Configuration of Communication Device 5

The circuit configuration of a radio-frequency circuit 1 and the circuit configuration of a communication device 5 are described below with reference to FIG. 1. FIG. 1 is a diagram illustrating the circuit configuration of the radio-frequency circuit 1 according to the exemplary embodiment and the circuit configuration of the communication device 5 according to the exemplary embodiment.

1.1 Circuit Configuration of Communication Device 5

The following describes the circuit configuration of the communication device 5. Referring to FIG. 1, the communication device 5 according to the exemplary embodiment includes the radio-frequency circuit 1, antennas 2A and 2B, a radio-frequency integrated circuit (RFIC) 3, and a baseband integrated circuit (BBIC) 4.

The radio-frequency circuit 1 transmits radio-frequency signals between the RFIC 3 and the antennas 2A and 2B. The internal configuration of the radio-frequency circuit 1 will be described later.

The antennas 2A and 2B are connected to antenna connection terminals 101 and 102, respectively, of the radio-frequency circuit 1 to enable the radio-frequency circuit 1 to transmit radio-frequency signals and to receive radio-frequency signals from the outside.

The RFIC 3 is an example of a signal processing circuit that processes radio-frequency signals. Specifically, the RFIC 3 generates reception signals by performing signal processing such as down-conversion on radio-frequency signals input through a reception path in the radio-frequency circuit 1 and outputs the reception signals to the BBIC 4. The RFIC 3 generates radio-frequency transmission signals by performing signal processing such as up-conversion on transmission signals input from the BBIC 4 and outputs the radio-frequency transmission signals to a transmission path in the radio-frequency circuit 1. The RFIC 3 includes a control unit configured to control components such as switches and amplifiers of the radio-frequency circuit 1. The control unit may be external to the RFIC 3; that is, the function of the control unit may be, in part or in whole, implemented by the BBIC 4 or the radio-frequency circuit 1.

The BBIC 4 is a baseband signal processing circuit that performs signal processing by using intermediate frequency bands lower than the frequency bands of radio-frequency signals transmitted through the radio-frequency circuit 1. The signals processed by the BBIC 4 are used, for example, as image signals for displaying an image and/or as audio signals for a telephone conversation through a speaker.

The antennas 2A and 2B and the BBIC 4 in the communication device 5 according to the exemplary embodiment are optional.

1.2 Circuit Configuration of Radio-Frequency Circuit 1

The following describes the circuit configuration of the radio-frequency circuit 1. Referring to FIG. 1, the radio-frequency circuit 1 includes power amplifiers 11 and 12 (indicated as PA), low-noise amplifiers 21 and 22 (indicated as LNA), matching circuits 401, 402, 411 to 413, 422, 431 to 433, 441 to 443, 452, and 461 to 463 (indicated as MN), switches 51 to 56 (indicated as SW), filters 61 to 66, PA controllers (PACs) 71 and 72, antenna connection terminals 101 and 102, radio-frequency input terminals 111 and 112, radio-frequency output terminals 121 and 122, and control terminals 131 and 132. Constituent elements of the radio-frequency circuit 1 will be described below one by one.

The antenna connection terminal 101 and the antenna 2A are connected to each other outside the radio-frequency circuit 1.

Radio-frequency transmission signals from the outside of the radio-frequency circuit 1 are received through the radio-frequency input terminals 111 and 112. The RFIC 3 and each of the radio-frequency input terminals 111 and 112 in the exemplary embodiment are connected to each other outside the radio-frequency circuit 1.

Radio-frequency reception signals are transmitted to the outside of the radio-frequency circuit 1 through the radio-frequency output terminals 121 and 122. The RFIC 3 and each of the radio-frequency output terminals 121 and 122 in the exemplary embodiment are connected to each other outside the radio-frequency circuit 1.

Control signals are transmitted through the control terminals 131 and 132. That is, each of the control terminals 131 and 132 is a terminal for receiving control signals from the outside of the radio-frequency circuit 1 and/or for supplying control signals to the outside of the radio-frequency circuit 1. The control signals are relevant to the control of electric circuits included in the radio-frequency circuit 1. Specifically, the control signals are digital signals for the control of at least one of the constituent elements including the power amplifiers 11 and 12, the low-noise amplifiers 21 and 22, and the switches 51 to 56. Digital signals for the control of the power amplifiers 11 and 12 can be transmitted from the RFIC 3 to the radio-frequency circuit 1 through the control terminals 131 and 132.

The power amplifier 11 is an example of a first power amplifier and is connected between the radio-frequency input terminal 111 and the filter 61 and between the radio-frequency input terminal 111 and the filter 62 to amplify transmission signals in a band A and transmission signals in a band B. Specifically, the power amplifier 11 has an input end and an output end. The input end of the power amplifier 11 is connected to the radio-frequency input terminal 111. The output end of the power amplifier 11 is connected to the filter 61 with the matching circuit 413, the switch 52, and the matching circuit 412 interposed therebetween. The output end of the power amplifier 11 is also connected to the filter 62 with the matching circuit 413, the switch 52, and the matching circuit 422 interposed therebetween.

The power amplifier 12 is an example of a second power amplifier and is connected between the radio-frequency input terminal 112 and the filter 64 and between the radio-frequency input terminal 112 and the filter 65 to amplify transmission signals in a band C and transmission signals in a band D. Specifically, the power amplifier 12 has an input end and an output end. The input end of the power amplifier 12 is connected to the radio-frequency input terminal 112. The output end of the power amplifier 12 is connected to the filter 64 with the matching circuit 443, the switch 55, and the matching circuit 442 interposed therebetween. The output end of the power amplifier 12 is also connected to the filter 65 with the matching circuit 443, the switch 55, and the matching circuit 452 interposed therebetween.

The power amplifiers 11 and 12 are electronic components that generate output signals higher in energy than input signals (transmission signals) by using electric power supplied by a power source. The power amplifiers 11 and 12 each may include an amplifying transistor and each may also include an inductor and/or a capacitor. It is not required that the power amplifiers 11 and 12 each have a particular internal configuration. For example, the power amplifiers 11 and 12 each may be a multistage amplifier, a differential amplifier, or a Doherty amplifier.

The low-noise amplifier 21 is an example of a second low-noise amplifier and is connected between the filter 62 and the radio-frequency output terminal 121 and between the filter 63 and the radio-frequency output terminal 121 to amplify reception signals in the band A and reception signals in the band B. Specifically, the low-noise amplifier 21 has an input end and an output end. The input end of the low-noise amplifier 21 is connected to the filter 62 with the matching circuit 433, the switches 53 and 52, and the matching circuit 422 interposed therebetween. The input end of the low-noise amplifier 21 is also connected to the filter 63 with the matching circuit 433, the switch 53, and the matching circuit 432 interposed therebetween. The output end of the low-noise amplifier 21 is connected to the radio-frequency output terminal 121.

The filters 62 and 63 in the exemplary embodiment are connected to the same low-noise amplifier, namely, the low-noise amplifier 21. In some exemplary embodiments, however, the filters 62 and 63 are connected to different low-noise amplifiers. In this case, the switch 53 in the radio-frequency circuit 1 is optional.

The low-noise amplifier 22 is an example of a first low-noise amplifier and is connected between the filter 65 and the radio-frequency output terminal 122 and between the filter 66 and the radio-frequency output terminal 122 to amplify reception signals in the band C and reception signals in the band D. Specifically, the low-noise amplifier 22 has an input end and an output end. The input end of the low-noise amplifier 22 is connected to the filter 65 with the matching circuit 463, the switches 56 and 55 and the matching circuit 452 interposed therebetween. The input end of the low-noise amplifier 22 is also connected to the filter 66 with the matching circuit 463, the switch 56, and the matching circuit 462 interposed therebetween. The output end of the low-noise amplifier 22 is connected to the radio-frequency output terminal 122.

The low-noise amplifiers 21 and 22 are electronic components that generate output signals higher in energy than input signals (reception signals) by using electric power supplied by the power source. The low-noise amplifiers 21 and 22 each include an amplifying transistor and each may also include an inductor and/or a capacitor. It is not required that the low-noise amplifiers 21 and 22 each have a particular internal configuration.

The matching circuits 401, 402, 411 to 413, 422, 431 to 433, 441 to 443, 452, and 461 to 463 are each connected between the respective two circuit elements to provide impedance matching between the circuit elements. That is, the matching circuits 401, 402, 411 to 413, 422, 431 to 433, 441 to 443, 452, and 461 to 463 are impedance matching circuits. That is, the matching circuits 401, 402, 411 to 413, 422, 431 to 433, 441 to 443, 452, and 461 to 463 each include an inductor and each may also include a capacitor.

The switch 51 is an example of a first switch and is connected between the antenna connection terminal 101 and the filter 61, between the antenna connection terminal 101 and the filter 62, and between the antenna connection terminal 101 and the filter 63. The switch 51 includes terminals 511 to 514. The terminal 511 is connected to the antenna connection terminal 101. The terminal 512 is connected to the filter 61 with the matching circuit 411 interposed therebetween. The terminal 513 is connected to the filter 62. The terminal 514 is connected to the filter 63 with the matching circuit 431 interposed therebetween.

The switch 51 configured as above can connect the terminal 511 to at least one of the terminals 512 to 514 in accordance with, for example, a control signal from the RFIC 3. That is, the switch 51 enables switching between connection of the antenna connection terminal 101 to each of the filters 61 to 63 and disconnection of the antenna connection terminal 101 from each of the filters 61 to 63. The switch 51 is, for example, a multi-connection switching circuit.

The switch 52 is an example of a second switch and is connected between the output end of the power amplifier 11 and the filter 61, between the output end of the power amplifier 11 and the filter 62, and between the input end of the low-noise amplifier 21 and the filter 62. The switch 52 includes terminals 521 to 524. The terminal 521 is connected to the filter 61 with the matching circuit 412 interposed therebetween. The terminal 522 is connected to the filter 62 with the matching circuit 422 interposed therebetween. The terminal 523 is connected to the output end of the power amplifier 11 with the matching circuit 413 interposed therebetween. The terminal 524 is connected to the input end of the low-noise amplifier 21 with the switch 53 and the matching circuit 433 interposed therebetween.

The switch 52 configured as above can connect the terminal 523 to the terminal 521 and/or the terminal 522 in accordance with, for example, a control signal from the RFIC 3 and can connect the terminal 522 to the terminal 523 or the terminal 524 in accordance with, for example, a control signal from the RFIC 3. That is, the switch 52 enables switching between connection of the power amplifier 11 to each of the filters 61 and 62 and disconnection of the power amplifier 11 from each of the filters 61 and 62 and enables switching between the state in which the filter 62 is connected to the power amplifier 11 and the state in which the filter 62 is connected to the low-noise amplifier 21. The switch 52 is, for example, a multi-connection switching circuit.

The switch 53 is connected between the input end of the low-noise amplifier 21 and the filter 62 and between the input end of the low-noise amplifier 21 and the filter 63. The switch 53 includes terminals 531 to 533. The terminal 531 is connected to the input end of the low-noise amplifier 21 with the matching circuit 433 interposed therebetween. The terminal 532 is connected to the terminal 524 of the switch 52 and is connected to the filter 62 with the switch 52 and the matching circuit 422 interposed therebetween. The terminal 533 is connected to the filter 63 with the matching circuit 432 interposed therebetween.

The switch 53 configured as above can connect the terminal 531 to the terminal 532 and/or the terminal 533 in accordance with, for example, a control signal from the RFIC 3. That is, the switch 53 enables switching between connection of the low-noise amplifier 21 to each of the filters 62 and 63 and disconnection of the low-noise amplifier 21 from each of the filters 62 and 63. The switch 53 is, for example, a multi-connection switching circuit.

The switch 54 is an example of a third switch and is connected between the antenna connection terminal 102 and the filter 64, between the antenna connection terminal 102 and the filter 65, and between the antenna connection terminal 102 and the filter 66. The switch 54 includes terminals 541 to 544. The terminal 541 is connected to the antenna connection terminal 102. The terminal 542 is connected to the filter 64 with the matching circuit 441 interposed therebetween. The terminal 543 is connected to the filter 65. The terminal 544 is connected to the filter 66 with the matching circuit 461 interposed therebetween.

The switch 54 configured as above can connect the terminal 541 to at least one of the terminals 542 to 544 in accordance with, for example, a control signal from the RFIC 3. That is, the switch 54 enables switching between connection of the antenna connection terminal 102 to each of the filters 64 to 66 and disconnection of the antenna connection terminal 102 from each of the filters 64 to 66. The switch 54 is, for example, a multi-connection switching circuit.

The switch 55 is connected between the output end of the power amplifier 12 and the filter 64, between the output end of the power amplifier 12 and the filter 65, and between the input end of the low-noise amplifier 22 and the filter 65. The switch 55 includes terminals 551 to 554. The terminal 551 is connected to the filter 64 with the matching circuit 442 interposed therebetween. The terminal 552 is connected to the filter 65 with the matching circuit 452 interposed therebetween. The terminal 553 is connected to the output end of the power amplifier 12 with the matching circuit 443 interposed therebetween. The terminal 554 is connected to the input end of the low-noise amplifier 22 with the switch 56 and the matching circuit 463 interposed therebetween.

The switch 55 configured as above can connect the terminal 553 to the terminal 551 and/or the terminal 552 in accordance with, for example, a control signal from the RFIC 3 and can connect the terminal 552 to the terminal 553 or the terminal 554 in accordance with, for example, a control signal from the RFIC 3. That is, the switch 55 enables switching between connection of the power amplifier 12 to each of the filters 64 and 65 and disconnection of the power amplifier 12 from each of the filters 64 and 65 and enables switching between the state in which the filter 65 is connected to the power amplifier 12 and the state in which the filter 65 is connected to the low-noise amplifier 22. The switch 55 is, for example, a multi-connection switching circuit.

The switch 56 is connected between the input end of the low-noise amplifier 22 and the filter 65 and between the input end of the low-noise amplifier 22 and the filter 66. The switch 56 includes terminals 561 to 563. The terminal 561 is connected to the input end of the low-noise amplifier 22 with the matching circuit 463 interposed therebetween. The terminal 562 is connected to the terminal 554 of the switch 55 and is connected to the filter 65 with the switch 55 and the matching circuit 452 interposed therebetween. The terminal 563 is connected to the filter 66 with the matching circuit 462 interposed therebetween.

The switch 56 configured as above can connect the terminal 561 to the terminal 562 and/or the terminal 563 in accordance with, for example, a control signal from the RFIC 3. That is, the switch 56 enables switching between connection of the low-noise amplifier 22 to each of the filters 65 and 66 and disconnection of the low-noise amplifier 22 from each of the filters 65 and 66. The switch 56 is, for example, a multi-connection switching circuit.

The filter 61 (A-Tx) is an example of a first filter and is connected between the power amplifier 11 and the antenna connection terminal 101. Specifically, one end of the filter 61 is connected to the antenna connection terminal 101 with the matching circuit 411, the switch 51, and the matching circuit 401 interposed therebetween. The other end of the filter 61 is connected to the output end of the power amplifier 11 with the matching circuit 412, the switch 52, and the matching circuit 413 interposed therebetween. The passband of the filter 61 includes the uplink operation band in the band A for frequency division duplex (FDD) such that the filter 61 allows transmission signals in the band A to pass therethrough. The uplink operation band in the band A is an example of a first band.

The filter 62 (B-TRx) is connected between the antenna connection terminal 101 and the power amplifier 11 and between the antenna connection terminal 101 and the low-noise amplifier 21. Specifically, one end of the filter 62 is connected to the antenna connection terminal 101 with the switch 51 and the matching circuit 401 interposed therebetween. The other end of the filter 62 is connected to the output end of the power amplifier 11 with the matching circuit 422, the switch 52, and the matching circuit 413 interposed therebetween and is connected to the input end of the low-noise amplifier 21 with the matching circuit 422, the switches 52 and 53, and the matching circuit 433 interposed therebetween. The passband of the filter 62 includes the band B for time division duplex (TDD) such that the filter 62 allows transmission signals and reception signals in the band B to pass therethrough. The simultaneous transmission of signals in the band A and signals in the band B can be enabled or disabled.

The filter 63 (A-Rx) is an example of a third filter and is connected between the low-noise amplifier 21 and the antenna connection terminal 101. Specifically, one end of the filter 63 is connected to the antenna connection terminal 101 with the matching circuit 431, the switch 51, and the matching circuit 401 interposed therebetween. The other end of the filter 63 is connected to the input end of the low-noise amplifier 21 with the matching circuit 432, the switch 53, and the matching circuit 433 interposed therebetween. The passband of the filter 63 includes the downlink operation band in the band A for FDD such that the filter 63 allows reception signals in the band A to pass therethrough. The downlink operation band in the band A is an example of a third band.

The filter 64 (C-Tx) is an example of a fourth filter and is connected between the power amplifier 12 and the antenna connection terminal 102. Specifically, one end of the filter 64 is connected to the antenna connection terminal 102 with the matching circuit 441, the switch 54, and the matching circuit 402 interposed therebetween. The other end of the filter 64 is connected to the output end of the power amplifier 12 with the matching circuit 442, the switch 55, and the matching circuit 443 interposed therebetween. The passband of the filter 64 includes the uplink operation band in the band C for FDD such that the filter 64 allows transmission signals in the band C to pass therethrough. The uplink operation band in the band C is an example of a fourth band.

The filter 65 (D-TRx) is connected between the antenna connection terminal 102 and the power amplifier 12 and between the antenna connection terminal 102 and the low-noise amplifier 22. Specifically, one end of the filter 65 is connected to the antenna connection terminal 102 with the switch 54 and the matching circuit 402 interposed therebetween. The other end of the filter 65 is connected to the output end of the power amplifier 12 with the matching circuit 452, the switch 55, and the matching circuit 443 interposed therebetween and is connected to the input end of the low-noise amplifier 22 with the matching circuit 452, the switches 55 and 56, and the matching circuit 463 interposed therebetween. The passband of the filter 65 includes the band D for TDD such that the filter 65 allows transmission signals and reception signals in the band D to pass therethrough.

The filter 66 (C-Rx) is connected between the low-noise amplifier 22 and the antenna connection terminal 102. Specifically, one end of the filter 66 is connected to the antenna connection terminal 102 with the matching circuit 461, the switch 54, and the matching circuit 402 interposed therebetween. The other end of the filter 66 is connected to the input end of the low-noise amplifier 22 with the matching circuit 462, the switch 56, and the matching circuit 463 interposed therebetween. The passband of the filter 66 includes the downlink operation band in the band C for FDD such that the filter 66 allows reception signals in the band C to pass therethrough. The downlink operation band in the band C is an example of a second band.

The PA controller 71 is capable of controlling the power amplifier 11. For example, the PA controller 71 receives a digital control signal from the RFIC 3 via the control terminal 131 and outputs the control signal to the power amplifier 11.

The PA controller 72 is capable of controlling the power amplifier 12. For example, the PA controller 72 receives a digital control signal from the RFIC 3 via the control terminal 132 and outputs the control signal to the power amplifier 12.

The bands A to D are frequency bands for a communication system implemented through the use of a radio access technology (RAT). The bands A to D are predefined by, for example, standardizing bodies, such as the 3rd generation partnership project (3GPP) and the Institute of Electrical and Electronics Engineers (IEEE). Examples of the communication system include the 5th Generation New Radio (5GNR) system, the Long Term Evolution (LTE) system, and the Wireless Local Area Network (WLAN) system.

The bands A and B may belong to one band group, and the bands C and D may belong to another band group. Alternatively, the bands A to D may belong to the same band group. The term "band group" herein means a frequency range including more than one band. Examples of the band group include an ultrahigh band group (3,300 to 5,000 MHz), a high band group (2,300 to 2,690 MHz), a midband group (1,427 to 2,200 MHz), and a low band group (698 to 960 MHz) but are not limited thereto. For example, a band group including an unlicensed band of 5 GHz or above or a millimeter-wave band group may be used.

For example, the bands A and B may belong to the low band group, and the bands C and D may belong to the midband group or the high band group. Alternatively, the bands A and B may belong to the midband group, and the bands C and D may belong to the ultrahigh band group.

The frequency of a harmonic wave of a signal in the uplink operation band in the band A is included in the downlink operation band in the band C. That is, at least part of the frequency range that is an integer multiple (e.g., the double) of the frequency range of the uplink operation band in the band A corresponds to at least part of the frequency range of the downlink operation band in the band C. The frequency of a harmonic wave of a signal in the uplink operation band in the band C is not included in the downlink operation band in the band A. That is, the frequency range that is an integer multiple (e.g., the double) of the frequency range of the uplink operation band in the band C does not overlap the frequency range of the downlink operation band in the band A.

For example, one of Band8 for LTE and n8 for 5GNR and one of Band3 for LTE and n3 for 5GNR may be used in combination to meet the requirement pertaining to the frequency ranges of the band A and the band C. Alternatively, one of Band12 for LTE and n12 for 5GNR and one of Band4 for LTE and n4 for 5GNR may be used in combination. Examples of the combination of the band A and the band C is not limited to those mentioned above.

An example of the radio-frequency circuit 1 is illustrated in FIG. 1; however, it is not required that the radio-frequency circuit 1 be configured as illustrated in FIG. 1. For example, the bands supported by the radio-frequency circuit 1 are not limited to the bands A to D. In some exemplary embodiments, the radio-frequency circuit 1 supports five or more bands. In this case, the radio-frequency circuit 1 may include filters for bands E, F, G, . . . in addition to the filters for the bands A to D. Alternatively, the radio-frequency circuit 1 may support the bands A and B without supporting the bands C and D. In this case, the radio-frequency circuit 1 does not need to include the power amplifier 12, the low-noise amplifier 22, the matching circuits 441 to 443, 452, and 461 to 463, the radio-frequency input terminal 112, and the radio-frequency output terminal 122.

At least one of the matching circuits mentioned above (the matching circuits 401, 402, 411 to 413, 422, 431 to 433, 441 to 443, 452, and 461 to 463) may be omitted from the radio-frequency circuit 1. The radio-frequency circuit 1 may be connected to multiple antennas and may include multiple antenna connection terminals. The radio-frequency circuit 1 may include a greater number of radio-frequency input terminals. In this case, a switch may be interposed between a power amplifier and radio-frequency input terminals to enable switching between connection of the power amplifier to each of the radio-frequency input terminals and disconnection of the power amplifier from each of the radio-frequency input terminals. The radio-frequency circuit 1 may also include a greater number of radio-frequency output terminals. In this case, a switch may be interposed between a low-noise amplifier and radio-frequency output terminals to enable switching between connection of the low-noise amplifier to each of the radio-frequency output terminals and disconnection of the low-noise amplifier from each of the radio-frequency output terminals.

2 Example of Radio-Frequency Circuit 1

As an example of the radio-frequency circuit 1 according to the exemplary embodiment mentioned above, a radio-frequency module 1A is described below with reference to FIGS. 2 to 5. The radio-frequency circuit 1 is incorporated in the radio-frequency module 1A.

2.1 Layout of Components of Radio-Frequency Module 1A

Figure 2:
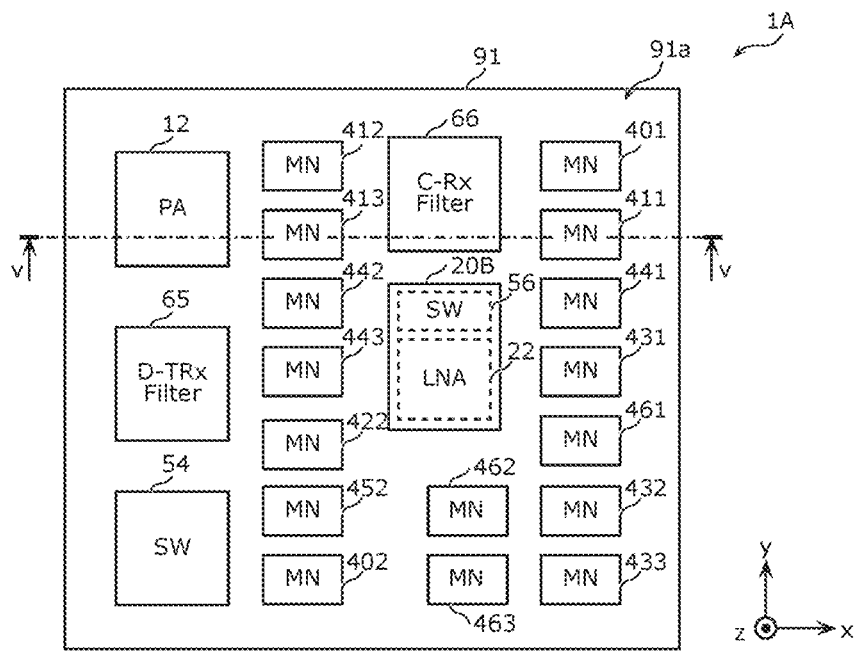
FIG. 2 is a plan view of a first main surface of the radio-frequency module in an example.
Figure 3:
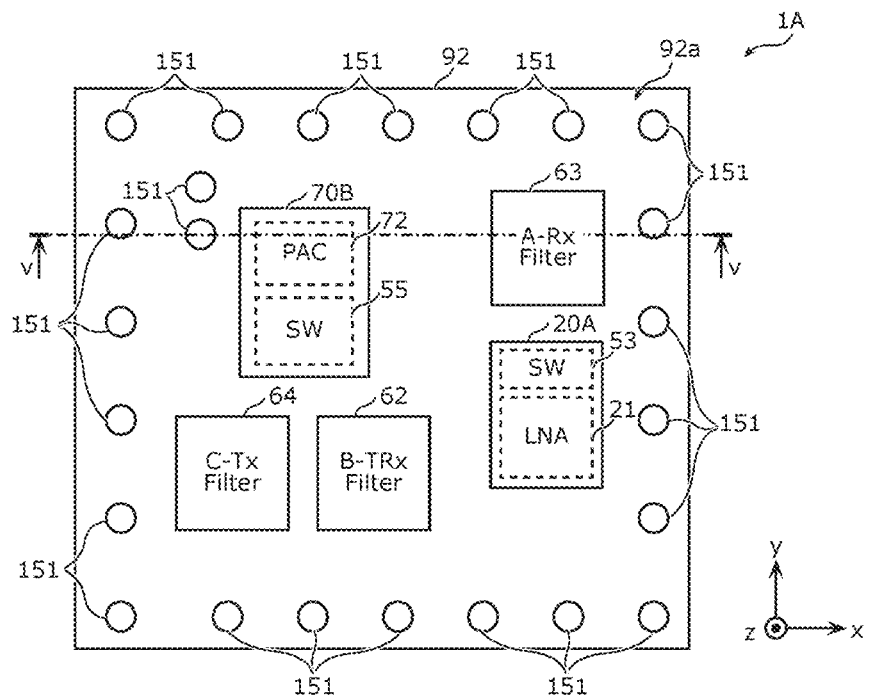
FIG. 3 is a plan view of a third main surface of the radio-frequency module in the example.
Figure 4:
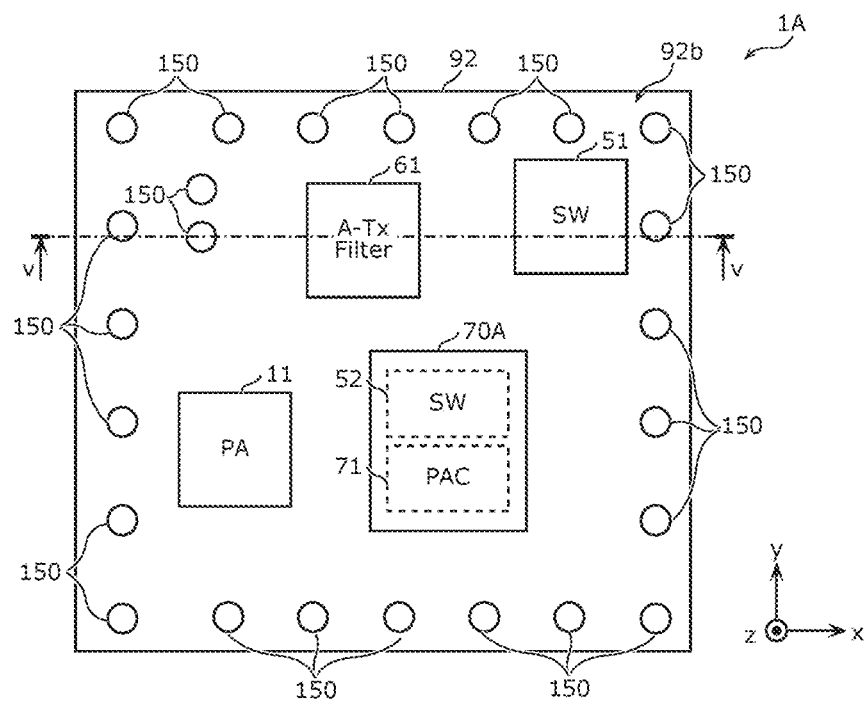
FIG. 4 is a plan view of a fourth main surface of the radio-frequency module in the example.
Figure 5:
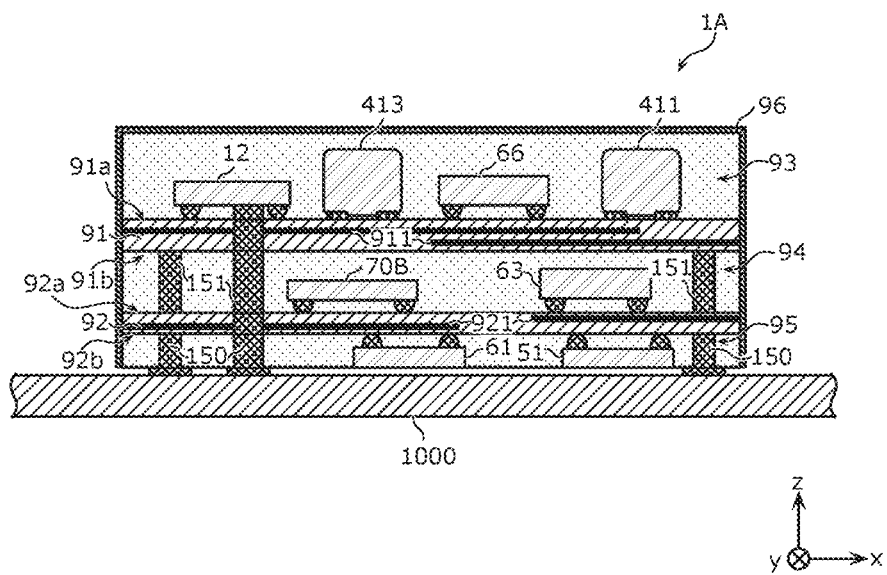
FIG. 5 is a sectional view of the radio-frequency module in the example.

FIG. 2 is a plan view of a main surface 91a of the radio-frequency module 1A in the present example. FIG. 3 is a plan view of a main surface 92a of the radio-frequency module 1A in the present example or, more specifically, a plan perspective view of a module substrate 92 with the main surface 92a seen from the positive side in the direction of the z axis. FIG. 4 is a plan view of a main surface 92b of the radio-frequency module 1A in the present example or, more specifically, a plan perspective view of the module substrate 92 with the main surface 92b seen from the positive side in the direction of the z axis. FIG. 5 is a sectional view of the radio-frequency module 1A in the present example. More specifically, FIG. 5 is a sectional view of the radio-frequency module 1A taken along line v-v in FIGS. 2 to 4.

Wiring between electronic components on a module substrate 91 and wiring between electronic components on the module substrate 92 are not illustrated in FIGS. 2 to 5. Resin members 93 to 95 and a shield electrode layer 96, which covers surfaces of the resin members 93 to 95, are not illustrated in FIGS. 2 to 4.

The radio-frequency module 1A includes, in addition to the electronic components including circuit elements illustrated in FIG. 1, the module substrates 91 and 92, the resin members 93 to 95, the shield electrode layer 96, external connection terminals 150, and board-to-board connection terminals 151.

The module substrate 91 is an example of a first module substrate and has main surfaces on opposite sides. The main surfaces of the module substrate 91 are denoted by 91a and 91b, respectively. The main surface 91a is an example of a first main surface, and the main surface 91b is an example of a second main surface. The module substrate 91 includes a ground electrode pattern 911, which is located within the module substrate 91. The ground electrode pattern 911 is connected to ground terminals and is thus placed at the ground potential.

The module substrate 92 is an example of a second module substrate and has main surfaces on opposite sides. The main surfaces of the module substrate 92 are denoted by 92a and 92b, respectively. The main surface 92a is an example of a third main surface, and the main surface 92b is an example of a fourth main surface.

The module substrate 92 includes a ground electrode pattern 921, which is located within the module substrate 92. The ground electrode pattern 921 is connected to ground terminals and is thus placed at the ground potential.

The module substrates 91 and 92 face each other, with the main surface 91b of the module substrate 91 oriented toward the main surface 92a of the module substrate 92. The module substrates 91 and 92 are located away from each other so that electronic components can be disposed between the main surfaces 91b and 92a. The electronic components are disposed on the module substrates 91 and 92. More specifically, the electronic components are arranged in three tiers, that is, the electronic components include electronic components disposed between the main surfaces 91b and 92a, electronic components disposed on the main surface 91a, and electronic components disposed on the main surface 92b.

Although the module substrates 91 and 92 illustrated in FIGS. 2 to 5 are rectangular in shape and equal in size when viewed in plan, the module substrates 91 and 92 may be different-sized substrates and/or may have different shapes. It is not required that the module substrates 91 and 92 be rectangular in shape.

Substrates that may be used as the module substrates 91 and 92 include: a low-temperature co-fired ceramic (LTCC) substrate including dielectric layers stacked on one another; a high-temperature co-fired ceramic (HTCC) substrate including dielectric layers stacked on one another; a substrate with embedded components; a substrate provided with a redistribution layer (RDL); and a printed circuit board but are not limited thereto.

Examples of one or more second electronic components disposed on the main surface 91a (i.e., in an upper tier) include the power amplifier 12, an integrated circuit 20B, the switch 54, the filters 65 and 66, the matching circuits 401, 402, 411 to 413, 422, 431 to 433, 441 to 443, 452, and 461 to 463.

The integrated circuit 20B is an electronic component including the low-noise amplifier 22 and the switch 56. For example, complementary metal-oxide-semiconductor (CMOS) technology or, more specifically silicon-on-insulator (SOI) process technology may be employed to produce the power amplifier 12, the integrated circuit 20B, and the switch 54. With the use of such a technology, electronic components can be produced inexpensively. Each of the electronic components may be made of at least one of gallium arsenide (GaAs), silicon-germanium (SiGe), and gallium nitride (GaN). The electronic components can thus be high in quality. Examples of the semiconductor materials of the electronic components are not limited to those mentioned above.

The filters 65 and 66 each may be a surface acoustic wave (SAW) filter, a bulk acoustic wave (BAW) filter, an LC resonant filter, or a dielectric filter but are not limited thereto.

The matching circuits 401, 402, 411 to 413, 422, 431 to 433, 441 to 443, 452, and 461 to 463 each include a chip inductor. A chip inductor is an electronic component including an inductor and is a surface-mount device (SMD) serving as an inductor. The chip inductors are disposed on the main surface 91*a*; that is, the chip inductors are not located between the main surfaces 91*b* and 92*a* and are not located on the main surface 92*b*. In other words, the chip inductors are disposed in one of the three tiers or, more specifically, in the upper tier only.

The matching circuits each may include a chip capacitor in addition to or in place of a chip inductor. The layout of chip capacitors is not limited. It is not required that all of the matching circuits be surface-mounted components. For example, the inductors and/or capacitors included in some of the matching circuits may be provided in the module substrate 91 and/or the module substrate 92.

The filters are not as tall as the chip inductors as illustrated in FIG. 5. In some exemplary embodiments, however, the filters are taller than the chip inductors or are equal in height to the chip inductors. In this case, the filters may be in contact with the shield electrode layer 96. This yields improvements in thermal dissipation properties of the filters, and in turn, improvements in the temperature characteristics of the filters.

The resin member 93 covers the main surface 91*a* and the electronic components on the main surface 91*a*. The resin member 93 ensures reliability, such as mechanical strength and moisture resistance, of the electronic components on the main surface 91*a*. The resin member 93 in the radio-frequency module 1A is optional.

Examples of one or more third electronic components disposed on the main surfaces 91*b* and 92*a* (i.e., in the middle tier) include integrated circuits 20A and 70B, the filters 62 to 64, and the board-to-board connection terminals 151. The electronic components disposed between the main surfaces 91*b* and 92*a* are covered with the resin member 94 filled between the main surfaces 91*b* and 92*a*.

The integrated circuit 20A is an electronic component including the low-noise amplifier 21 and the switch 53. The integrated circuit 70B is an electronic component including the switch 55 and the PA controller 72. For example, CMOS technology or, more specifically SOI process technology may be employed to produce the integrated circuits 20A and 70B. With the use of such a technology, electronic components can be produced inexpensively. Each of the electronic components may be made of at least one of GaAs, SiGe, and GaN. The electronic components can thus be high in quality. Examples of the semiconductor materials of the electronic components are not limited to those mentioned above.

The filters 62 to 64 each may be a SAW filter, a BAW filter, an LC resonant filter, or a dielectric filter but are not limited thereto.

The electronic components disposed between the main surfaces 91*b* and 92*a* are electrically connected to the main surface 92*a* of the module substrate 92 with electrodes therebetween. The electrodes concerned face the module substrate 92. In some exemplary embodiments, however, the electronic components disposed between the main surfaces 91*b* and 92*a* are electrically connected to the main surface 91*b* of the module substrate 91 with electrodes therebetween. The electrodes concerned face the module substrate 91.

The board-to-board connection terminals 151 connect the module substrate 91 to the module substrate 92. That is, the board-to-board connection terminals 151 electrically connect the electronic components on the module substrate 91 to the electronic components on the module substrate 92. For example, the board-to-board connection terminals 151 are post-shaped electrodes made of copper but are not limited thereto.

The resin member 94 covers the main surfaces 91*b* and 92*a* and the electronic components disposed between the main surfaces 91*b* and 92*a*. The resin member 94 ensures reliability, such as mechanical strength and moisture resistance, of the electronic components between the main surfaces 91*b* and 92*a*. The resin member 94 in the radio-frequency module 1A is optional.

Examples of one or more first electronic components disposed on the main surface 92*b* (i.e., in the lower tier) include the power amplifier 11, the switch 51, the filter 61, an integrated circuit 70A, and the external connection terminals 150.

The integrated circuit 70A is an electronic component including the switch 52 and the PA controller 71. For example, CMOS technology or, more specifically SOI process technology may be employed to produce the power amplifier 11, the switch 51, and the integrated circuit 70A. With the use of such a technology, electronic components can be produced inexpensively. Each of the electronic components may be made of at least one of GaAs, SiGe, and GaN. The electronic components can thus be high in quality. Examples of the semiconductor materials of the electronic components are not limited to those mentioned above.

The filter 61 may be a SAW filter, a BAW filter, an LC resonant filter, or a dielectric filter but are not limited thereto.

When viewed in plan, the switch 51 does not overlap the filter 66 disposed on the main surface 91*a*. Likewise, when viewed in plan, the switch 51 does not overlap the chip inductor disposed on the main surface 91*a* as the matching circuit 462 and/or the chip inductor disposed on the main surface 91*a* as the matching circuit 463.

The external connection terminals 150 include ground terminals as well as the terminals illustrated in FIG. 1, namely, the antenna connection terminals 101 and 102, the radio-frequency input terminals 111 and 112, the radio-frequency output terminals 121 and 122, and the control terminals 131 and 132. The external connection terminals 150 are connected to, for example, input/output terminals and/or ground terminals on a motherboard 1000, which is disposed on the negative side in the direction of the z axis of the radio-frequency module 1A. For example, the external connection terminals 150 are post-shaped electrodes made of copper but are not limited thereto.

The resin member 95 covers the main surface 92*b* and the electronic components on the main surface 92*b*. The resin member 95 ensures reliability, such as mechanical strength and moisture resistance, of the electronic components on the main surface 92*b*. The resin member 95 in the radio-frequency module 1A is optional.

For example, the shield electrode layer 96 is a thin metal film formed by sputtering and covers an upper surface of the resin member 93, side surfaces of the resin member 93 to 95, and side surfaces of the module substrates 91 and 92. The shield electrode layer 96 is connected to the ground and eliminates or reduces the possibility that extraneous noise will enter the electronic components constituting the radio-frequency module 1A. The shield electrode layer 96 in the radio-frequency module 1A is optional.

2.2 Effects of Radio-Frequency Module 1A

As described above, the radio-frequency module 1A in the present example includes the module substrate 91, the module substrate 92, one or more first electronic components, one or more second electronic components, one or more third electronic components, and the external connection terminals 150. The module substrate 91 has the main surfaces 91a and 91b on opposite sides. The module substrate 92 has the main surfaces 92a and 92b on opposite sides. The main surface 92a is oriented toward the main surface 91b. The one or more first electronic components are disposed on one of the main surfaces 91a and 92b. The one or more second electronic components are disposed on the other one of the main surfaces 91a and 92b. The one or more third electronic components are disposed between the main surfaces 91b and 92a. The external connection terminals 150 are disposed the main surface 92b. The one or more first electronic components include at least one of (i) the filter 61 whose passband includes the first band, (ii) the switch 51 connected between the filter 61 and the antenna connection terminal 101, (iii) the power amplifier 11 connected to the filter 61, (iv) the switch 52 (the integrated circuit 70A) connected between the filter 61 and the power amplifier 11. The one or more second electronic components include at least one of (i) the filter 66 whose passband includes the second band in which the frequency of a harmonic wave of a signal in the first band is included, (ii) the switch 54 connected between the filter 66 and the antenna connection terminal 102, (iii) the low-noise amplifier 22 (the integrated circuit 20B) connected to the filter 66, and (iv) the inductor (the matching circuit 461, 462, or 463) connected to a path that forms a connection between the low-noise amplifier 22 and the antenna connection terminal 102.

The one or more electronic components, the one or more second electronic components, and the one or more third electronic components are disposed in three tiers, namely, on the main surface 91a (in the upper tier), on the main surface 92b (in the lower tier), and between the main surfaces 91b and 92a (in the middle tier), respectively. This layout enables the radio-frequency module 1A to achieve area savings when viewed in plan. That is, the radio-frequency module 1A is more compact in size. The two module substrates respectively denoted by 91 and 92 are disposed between the first electronic component (the power amplifier 11, the switch 51 or 52, or the filter 61) being the source of harmonic waves and connected to the transmission path for the first band and the second electronic component (the low-noise amplifier 22, the switch 54, the filter 66, or the matching circuit 461, 462, or 463) being connected to the reception path for the second band and being susceptible to the harmonic waves. This layout eliminates or reduces the occurrence of coupling between the first electronic component and the second electronic component. Accordingly, harmonic waves of signals in the first band are kept from entering the reception path for the second band and from consequently causing degradation of reception sensitivity.

The one or more first electronic components in the present example may be disposed on the main surface 92b, and the and the one or more second electronic components of the radio-frequency module 1A in the present example may be disposed on the main surface 91a.

This means that the first electronic component being the source of harmonic waves is disposed on the main surface 92b provided with the external connection terminals 150. In this case, harmonic waves produced in the first electronic component can be emitted out of the radio-frequency module 1A through the external connection terminals 150 (ground terminals) in the vicinity of the first electronic component. Accordingly, the harmonic waves of signals are kept from entering the second electronic component and from consequently causing degradation of reception sensitivity.

The switch 51 may be the first electronic component (or one of the first electronic components) of the radio-frequency module 1A in the present example.

In this case, the two module substrates respectively denoted by 91 and 92 are located between the switch 51 and the second electronic component(s). Harmonic waves produced in the switch 51 are not attenuated in the filter 61 and can consequently case significant degradation of reception sensitivity upon entry into the reception path. The layout above eliminates or reduces the occurrence of coupling between the switch 51 and the second electronic component and, by extension, the possibility that harmonic waves produced in the switch 51 will cause degradation of reception sensitivity.

The filter 66 may be the second electronic component (or one of the second electronic components) of the radio-frequency module 1A in the present example.

In this case, the two module substrates respectively denoted by 91 and 92 are located between the filter 66 and the first electronic component(s). The layout above eliminates or reduces the occurrence of coupling between the filter 66 and the first electronic component and, by extension, the possibility that harmonic waves produced in the first electronic component will cause degradation of reception sensitivity.

There may be no overlap between the switch 51 and the filter 66 when the radio-frequency module 1A in the present example is viewed in plan.

The layout above further eliminates or reduces the occurrence of coupling between the switch 51 and the filter 66 and, by extension, the possibility that harmonic waves produced in the switch 51 will cause degradation of reception sensitivity.

An inductor (the matching circuit 461, 462, or 463) may be the second electronic component (or one of the second electronic components) of the radio-frequency module 1A in the present example.

In this case, the two module substrates respectively denoted by 91 and 92 are located between the inductor (the matching circuit 461, 462, or 463) and the first electronic component(s). With the inductor (the matching circuit 461, 462, or 463) being liable to be coupled to another electronic component, the layout above eliminates or reduces the occurrence of coupling between the inductor (the matching circuit 461, 462, or 463) and the first electronic component and, by extension, the possibility that harmonic waves produced in the first electronic component will cause degradation of reception sensitivity.

An inductor (the matching circuit 462 or 463) of the radio-frequency module 1A in the present example may be connected between the filter 66 and the low-noise amplifier 22.

The layout above, that is, the inductor (the matching circuit 462 or 463) connected between the filter 66 and the low-noise amplifier 22 eliminates or reduces the occurrence of coupling between the inductor (the matching circuit 462 or 463) and the first electronic component and, by extension, the possibility that harmonic waves produced in the first electronic component will cause degradation of reception sensitivity.

There may be no overlap between the switch 51 and the inductor (the matching circuit 462 or 463) when the radio-frequency module 1A in the present example is viewed in plan.

The layout above further eliminates or reduces the occurrence of coupling between the switch 51 and the inductor (the matching circuit 462 or 463) and, by extension, the possibility that harmonic waves produced in the switch 51 will cause degradation of reception sensitivity.

The filter 63 whose passband includes the third band may be the third electronic component (or one of the third electronic components) of radio-frequency module 1A in the present example, in which case the frequency of a harmonic wave of a signal in the first band is not included in the third band.

The filter 63 for the third band where the reception sensitivity is less likely to be degraded by harmonic waves of signals in the first band is disposed between the main surfaces 91b and 92a (i.e., in the middle tier). This means that the electronic components can be disposed in three tiers in a well-balanced fashion.

The low-noise amplifier 21 connected to the filter 63 may be the third electronic component (or one of the third electronic components) of the radio-frequency module 1A in the present example.

The low-noise amplifier 21 for the third band where the reception sensitivity is less likely to be degraded by harmonic waves of signals in the first band is disposed between the main surfaces 91b and 92a (i.e., in the middle tier). This means that the electronic components can be disposed in three tiers in a well-balanced fashion.

The filter 64 whose passband includes the fourth band may be the third electronic component (or one of the third electronic components) of radio-frequency module 1A in the present example, in which case the frequency of a harmonic wave of a signal in the fourth band is not included in the second band.

The filter 64 for the fourth band where the reception sensitivity in the second band is less likely to be degraded is disposed between the main surfaces 91b and 92a (i.e., in the middle tier). This means that the electronic components can be disposed in three tiers in a well-balanced fashion.

The power amplifier 12 connected to the filter 64 may be the third electronic component (or one of the third electronic components) of the radio-frequency module 1A in the present example.

The power amplifier 12 for the fourth band where the reception sensitivity in the second band is less likely to be degraded is disposed between the main surfaces 91b and 92a (i.e., in the middle tier). This means that the electronic components can be disposed in three tiers in a well-balanced fashion.

The filter 61 may be the first electronic component (or one of the first electronic components) of the radio-frequency module 1A in the present example.

In this case, the two module substrates respectively denoted by 91 and 92 are located between the filter 61 and the second electronic component(s). The layout above eliminates or reduces the occurrence of coupling between the filter 61 and the second electronic component and, by extension, the possibility that harmonic waves produced in the filter 61 will cause degradation of reception sensitivity.

The power amplifier 11 may be the first electronic component (or one of the first electronic components) of the radio-frequency module 1A in the present example.

In this case, the two module substrates respectively denoted by 91 and 92 are located between the power amplifier 11 and the second electronic component(s). The layout above eliminates or reduces the occurrence of coupling between the power amplifier 11 and the second electronic component and, by extension, the possibility that harmonic waves produced in the power amplifier 11 will cause degradation of reception sensitivity.

The switch 52 may be the first electronic component (or one of the first electronic components) of the radio-frequency module 1A in the present example.

In this case, the two module substrates respectively denoted by 91 and 92 are located between the switch 52 and the second electronic component(s). The layout above eliminates or reduces the occurrence of coupling between the switch 52 and the second electronic component and, by extension, the possibility that harmonic waves produced in the switch 52 will cause degradation of reception sensitivity.

The switch 54 may be the second electronic component (or one of the second electronic components) of the radio-frequency module 1A in the present example.

In this case, the two module substrates respectively denoted by 91 and 92 are located between the switch 54 and the first electronic component(s). The layout above eliminates or reduces the occurrence of coupling between the switch 54 and the first electronic component and, by extension, the possibility that harmonic waves produced in the first electronic component will cause degradation of reception sensitivity.

The low-noise amplifier 22 may be the second electronic component (or one of the second electronic components) of the radio-frequency module 1A in the present example.

In this case, the two module substrates respectively denoted by 91 and 92 are located between the low-noise amplifier 22 and the first electronic component(s). The layout above eliminates or reduces the occurrence of coupling between the low-noise amplifier 22 and the first electronic component and, by extension, the possibility that harmonic waves produced in the first electronic component will cause degradation of reception sensitivity.

The first band for the radio-frequency module 1A in the present example may be the uplink operation band in Band8 for LTE or the uplink operation band in n8 for 5GNR, and the second band for the radio-frequency module 1A in the present example may be the downlink operation band in Band3 for LTE or the downlink operation band in n3 for 5GNR.

The radio-frequency module 1A can thus transmit signals in Band8 or n8 in such a way as to eliminate or reduce the possibility that harmonic waves of signals in Band8 or n8 will cause degradation of reception sensitivity in Band3 or n3.

The first band for the radio-frequency module 1A in the present example may be the uplink operation band in Band12 for LTE or the uplink operation band in n12 for 5GNR, and the second band for the radio-frequency module 1A in the present example may be the downlink operation band in Band4 for LTE or the downlink operation band in n4 for 5GNR.

The radio-frequency module 1A can thus transmit signals in Band12 or n12 in such a way as to eliminate or reduce the possibility that harmonic waves of signals in Band12 or n12 will cause degradation of reception sensitivity in Band4 or n4.

The communication device 5 in the present example includes the RFIC 3 and the radio-frequency module 1A. The RFIC 3 processes radio-frequency signals. The radio-frequency module 1A transmits radio-frequency signals between the RFIC 3 and the antennas 2A and 2B.

With this configuration, the communication device 5 is capable of producing the aforementioned effects of the radio-frequency module 1A.

(Modifications)

The radio-frequency module and the communication device according to the present disclosure are not limited to the exemplary embodiment and the example that have been described so far. The present disclosure embraces other examples implemented by varying combinations of constituent elements of the example above, other modifications that may be achieved by those skilled in the art through various conceivable alterations to the exemplary embodiment and/or the example within a range not departing from the spirit of the present disclosure, and various types of devices including the radio-frequency module.

With regard to the circuit configuration of the radio-frequency circuit in the exemplary embodiment above and the circuit configuration of the communication device according to the exemplary embodiment above, the paths forming connections between the circuit elements and the signal paths illustrated in the drawings may have, for example, other circuit elements and wiring disposed thereon. For example, the radio-frequency circuit may include a matching circuit disposed between the switch 51 and the filter 62 and/or a matching circuit disposed between the switch 51 and the filter 65.

The first filter in the exemplary embodiment above is the filter 61 whose passband includes the uplink operation band in the band A for FDD. In some exemplary embodiments, however, the first filter is a filter whose passband includes frequency bands for TDD.

The second filter in the exemplary embodiment above is the filter 66 whose passband includes the downlink operation band in the band C for FDD. In some exemplary embodiments, however, the second filter is a filter whose passband includes frequency bands for TDD.

The layout of the electronic components is not limited to the layout described in relation to the example above. For example, the one or more first electronic components in the example above are disposed on the main surfaces 92b, and the one or more second electronic components in the example above are disposed on the main surface 91a. Alternatively, the one or more first electronic components may be disposed on the main surface 91a, and the one or more second electronic components may be disposed on the main surface 92b.

The external connection terminals 150 in the example above are post-shaped electrodes made of copper but are not limited thereto. For example, the external connection terminals 150 may be bump electrodes. In this case, the resin member 95 of the radio-frequency module is optional.

INDUSTRIAL APPLICABILITY

The present disclosure may be widely used as radio-frequency modules disposed in front-end portions of communication devices such as mobile phones.

REFERENCE SIGNS LIST 1 radio-frequency circuit
1A radio-frequency module
2A, 2B antenna
3 RFIC
4 BBIC
5 communication device
11, 12 power amplifier
20A, 20B, 70A, 70B integrated circuit
21, 22 low-noise amplifier
51, 52, 53, 54, 55, 56 switch
61, 62, 63, 64, 65, 66 filter
71, 72 PA controller
91, 92 module substrate
91a, 91b, 92a, 92b main surface
93, 94, 95 resin member
96 shield electrode layer
101, 102 antenna connection terminal
111, 112 radio-frequency input terminal
121, 122 radio-frequency output terminal
131, 132 control terminal
150 external connection terminal
151 board-to-board connection terminal
401, 402, 411, 412, 413, 422, 431, 432, 433, 441, 442, 443, 452, 461, 462, 463 matching circuit
511, 512, 513, 514, 521, 522, 523, 524, 531, 532, 533, 541, 542, 543, 544, 551, 552, 553, 554, 561, 562, 563 terminal
911, 921 ground electrode pattern
1000 motherboard

The invention claimed is:

1. A radio-frequency module comprising:
a first module substrate having a first main surface and a second main surface on opposite sides;
a second module substrate having a third main surface and a fourth main surface on opposite sides, the third main surface being oriented toward the second main surface;
one or more first electronic components disposed on one of the first main surface and the fourth main surface;
one or more second electronic components disposed on another one of the first main surface and the fourth main surface;
one or more third electronic components disposed between the second main surface and the third main surface; and
a plurality of external connection terminals disposed on the fourth main surface, wherein
the one or more first electronic components include at least one of
(i) a first filter whose passband includes a first band,
(ii) a first switch connected between the first filter and a first antenna connection terminal,
(iii) a first power amplifier connected to the first filter, and
(iv) a second switch connected between the first filter and the first power amplifier, and
the one or more second electronic components include at least one of
(i) a second filter whose passband includes a second band in which frequency of a harmonic wave of a signal in the first band is included,
(ii) a third switch connected between the second filter and a second antenna connection terminal,
(iii) a first low-noise amplifier connected to the second filter, and
(iv) an inductor connected to a path that forms a connection between the first low-noise amplifier and the second antenna connection terminal,
wherein
the one or more third electronic components include a third filter whose passband includes a third band, and the frequency of the harmonic wave of the signal in the first band is not included in the third band.

2. The radio-frequency module according to claim 1, wherein
the one or more first electronic components are disposed on the fourth main surface, and
the one or more second electronic components are disposed on the first main surface.

3. The radio-frequency module according to claim 1, wherein the one or more first electronic components include the first switch.

4. The radio-frequency module according to claim 3, wherein the one or more second electronic components include the second filter.

5. The radio-frequency module according to claim 4, wherein the first switch does not overlap the second filter when viewed in plan.

6. The radio-frequency module according to claim 3, wherein the one or more second electronic components include the inductor.

7. The radio-frequency module according to claim 6, wherein the inductor is connected between the second filter and the first low-noise amplifier.

8. The radio-frequency module according to claim 6, wherein the first switch does not overlap the inductor when viewed in plan.

9. The radio-frequency module according to claim 1, wherein the one or more third electronic components include a second low-noise amplifier connected to the third filter.

10. The radio-frequency module according to claim 1, wherein the one or more first electronic components include the first filter.

11. The radio-frequency module according to claim 1, wherein the one or more first electronic components include the first power amplifier.

12. The radio-frequency module according to claim 1, wherein the one or more first electronic components include the second switch.

13. The radio-frequency module according to claim 1, wherein the one or more second electronic components include the third switch.

14. The radio-frequency module according to claim 1, wherein the one or more second electronic components include the first low-noise amplifier.

15. The radio-frequency module according to claim 1, wherein
the first band is an uplink operation band in Band8 for long term evolution (LTE) or an uplink operation band in n8 for 5th Generation New Radio (5GNR), and
the second band is a downlink operation band in Band3 for LTE or a downlink operation band in n3 for 5GNR.

16. The radio-frequency module according to claim 1, wherein
the first band is an uplink operation band in Band12 for LTE or an uplink operation band in n12 for 5GNR, and
the second band is a downlink operation band in Band4 for LTE or a downlink operation band in n4 for 5GNR.

17. A communication device comprising:
a signal processing circuit configured to process radio-frequency signals; and
the radio-frequency module according to claim 1, the radio-frequency module being configured to transmit the radio-frequency signals between the signal processing circuit and an antenna.

18. A radio-frequency module comprising:
a first module substrate having a first main surface and a second main surface on opposite sides;
a second module substrate having a third main surface and a fourth main surface on opposite sides, the third main surface being oriented toward the second main surface;
one or more first electronic components disposed on one of the first main surface and the fourth main surface;
one or more second electronic components disposed on another one of the first main surface and the fourth main surface;
one or more third electronic components disposed between the second main surface and the third main surface; and
a plurality of external connection terminals disposed on the fourth main surface, wherein
the one or more first electronic components include at least one of
(i) a first filter whose passband includes a first band,
(ii) a first switch connected between the first filter and a first antenna connection terminal,
(iii) a first power amplifier connected to the first filter, and
(iv) a second switch connected between the first filter and the first power amplifier, and
the one or more second electronic components include at least one of
(i) a second filter whose passband includes a second band in which frequency of a harmonic wave of a signal in the first band is included,
(ii) a third switch connected between the second filter and a second antenna connection terminal,
(iii) a first low-noise amplifier connected to the second filter, and
(iv) an inductor connected to a path that forms a connection between the first low-noise amplifier and the second antenna connection terminal, wherein
the one or more third electronic components include a fourth filter whose passband includes a fourth band, and
frequency of a harmonic wave of a signal in the fourth band is not included in the second band.

19. The radio-frequency module according to claim 18, wherein one or more third electronic components include a second power amplifier connected to the fourth filter.

* * * * *